United States Patent
Danilov et al.

(10) Patent No.: US 11,093,163 B2
(45) Date of Patent: *Aug. 17, 2021

(54) EFFICIENT CAPACITY MANAGEMENT FOR A DATA STORAGE SYSTEM

(71) Applicant: EMC IP Holding Company LLC, Hopkinton, MA (US)

(72) Inventors: Mikhail Danilov, Saint Petersburg (RU); Konstantin Buinov, Prague (CZ); Lu Lei, Shanghai (CN); Ao Sun, Shanghai (CN); Wesley Sun, Shanghai (CN); Gary Jialei Wu, Shanghai (CN); Yu Teng, Shanghai (CN); Chun Xi Kenny Chen, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 271 days.

This patent is subject to a terminal disclaimer.

(21) Appl. No.: 16/408,694

(22) Filed: May 10, 2019

(65) Prior Publication Data

US 2020/0356301 A1 Nov. 12, 2020

(51) Int. Cl.
*G06F 3/06* (2006.01)
(52) U.S. Cl.
CPC .......... *G06F 3/0652* (2013.01); *G06F 3/0608* (2013.01); *G06F 3/0644* (2013.01); *G06F 3/0673* (2013.01)
(58) Field of Classification Search
CPC ..... G06F 3/0652; G06F 3/0644; G06F 3/0673
See application file for complete search history.

(56) References Cited

U.S. PATENT DOCUMENTS

| | | | | |
|---|---|---|---|---|
| 9,405,709 | B1* | 8/2016 | Salpekar | G06F 3/0614 |
| 10,133,770 | B2 | 11/2018 | Danilov et al. | |
| 10,706,014 | B1* | 7/2020 | Gupta | G06F 3/064 |
| 2009/0144232 | A1* | 6/2009 | Duffy | G06F 16/24532 |
| 2010/0082636 | A1* | 4/2010 | Kruus | G06F 16/13 |
| | | | | 707/747 |
| 2014/0164444 | A1* | 6/2014 | Bowen | H01J 49/0004 |
| | | | | 707/821 |
| 2016/0013815 | A1* | 1/2016 | Wideman | H03M 13/154 |
| | | | | 714/766 |
| 2016/0077507 | A1* | 3/2016 | Sheble | G06Q 10/06 |
| | | | | 700/295 |

(Continued)

OTHER PUBLICATIONS

Danilov, et al., "Capacity Management for Trees Under Multi-Version Concurrency Control," U.S. Appl. No. 15/582,077, filed Apr. 28, 2017, 24 pages.

*Primary Examiner* — Eliyah S. Harper
(74) *Attorney, Agent, or Firm* — Amin, Turocy & Watson, LLP

(57) ABSTRACT

The disclosed technology generally describes separating types of data chunks in a copy-on-write/MVCC B+ tree, chunk-based data storage system, and also allocating the sizes of leaf chunks to be smaller than that of other (e.g., internal and root node) chunks. By having leaf chunks separate from node chunks, the probability of having a fully reclaimable (without copying) chunk is increased. Similarly, by having smaller sized leaf chunks relative to node chunks, the probability of having a fully reclaimable (without copying) leaf chunks is increased. The technology thus facilitates more efficient garbage collection.

20 Claims, 12 Drawing Sheets

(56) References Cited

U.S. PATENT DOCUMENTS

2017/0083549 A1    3/2017  Danilov et al.
2018/0181487 A1    6/2018  Danilov et al.
2020/0117547 A1*  4/2020  Danilov ................. G06F 3/067
2020/0183829 A1*  6/2020  Danilov ................. G06F 3/064
2020/0334142 A1* 10/2020  Danilov ................ G06F 3/0608

* cited by examiner

EFFICIENT CAPACITY MANAGEMENT FOR A DATA STORAGE SYSTEM

TECHNICAL FIELD

The subject application generally relates to storing data in data storage systems based on storage space reclamation considerations, and related embodiments.

BACKGROUND

Contemporary cloud-based data storage systems, such as ECS (formerly known as ELASTIC CLOUD STORAGE) provided by DELL EMC, can be based on a cluster of nodes that each owns some part of the stored data (and can store redundant data and/or erasure coded data for data protection purposes) in storage devices. For example, user data can be stored in a repository and the metadata (system metadata and metadata used to locate the user data) stored in search trees owned by a given node.

In ESC in general, disk space is partitioned into a set of blocks of fixed size called chunks. The information maintained in the cloud-based data storage system, including the user data and the various metadata, is stored in these chunks. For example, there are different types of chunks; user data is stored in repository chunks, while the metadata is stored in directory tables, where each directory table (DT) is a set of key-value search trees. Each tree element (node or leaf) is stored in a single page, and each page occupies continuous space of a single tree chunk. Trees may share chunks, that is, one chunk can contain elements of different trees.

For storing search tree data, ECS thus implements B+ tree data structures, made up of a root, internal nodes and leaves. The root node and internal node only contain keys, (<key, value> pairs, with the values being pointers) with the leaf nodes (or simply leaves) keeping <key, value> pairs, with the value in a <key, value> leaf comprising the data.

Chunk content is modified in an append-only mode, and when a chunk becomes full enough, that chunk gets sealed. The content of sealed chunks is immutable, and thus tree elements are immutable. As a result, trees are under a Multi-Version Concurrency Control policy (aka MVCC), whereby any tree update results in the reallocation of at least N pages, where N is the current depth of the tree. For example, the root changes after each tree update.

The fact that chunks are immutable generally does not allow implementing fine-grained reclamation (e.g., via garbage collection) of unused hard drive capacity, and thus an entire chunk is garbage collected as a unit. Eventually, due to object deletion and the like, a sealed tree chunk becomes completely unused, in that no node within the node cluster references a tree element that is part of the unused tree chunk. In such a state, the unused tree chunk can be garbage collected and its space reclaimed. It is also feasible to detect live objects stored in chunks that are "sparsely filled" (below a usage capacity threshold) and copy the corresponding pages that are in use to new chunks, such that the live data is stored in the new chunks and the chunk capacity of the sparsely filled chunk can be reclaimed. However, waiting for a chunk to become fully unused, or copying live data from sparsely filled chunks so as to make the chunk no longer in use, can be highly inefficient and consume significant resources.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
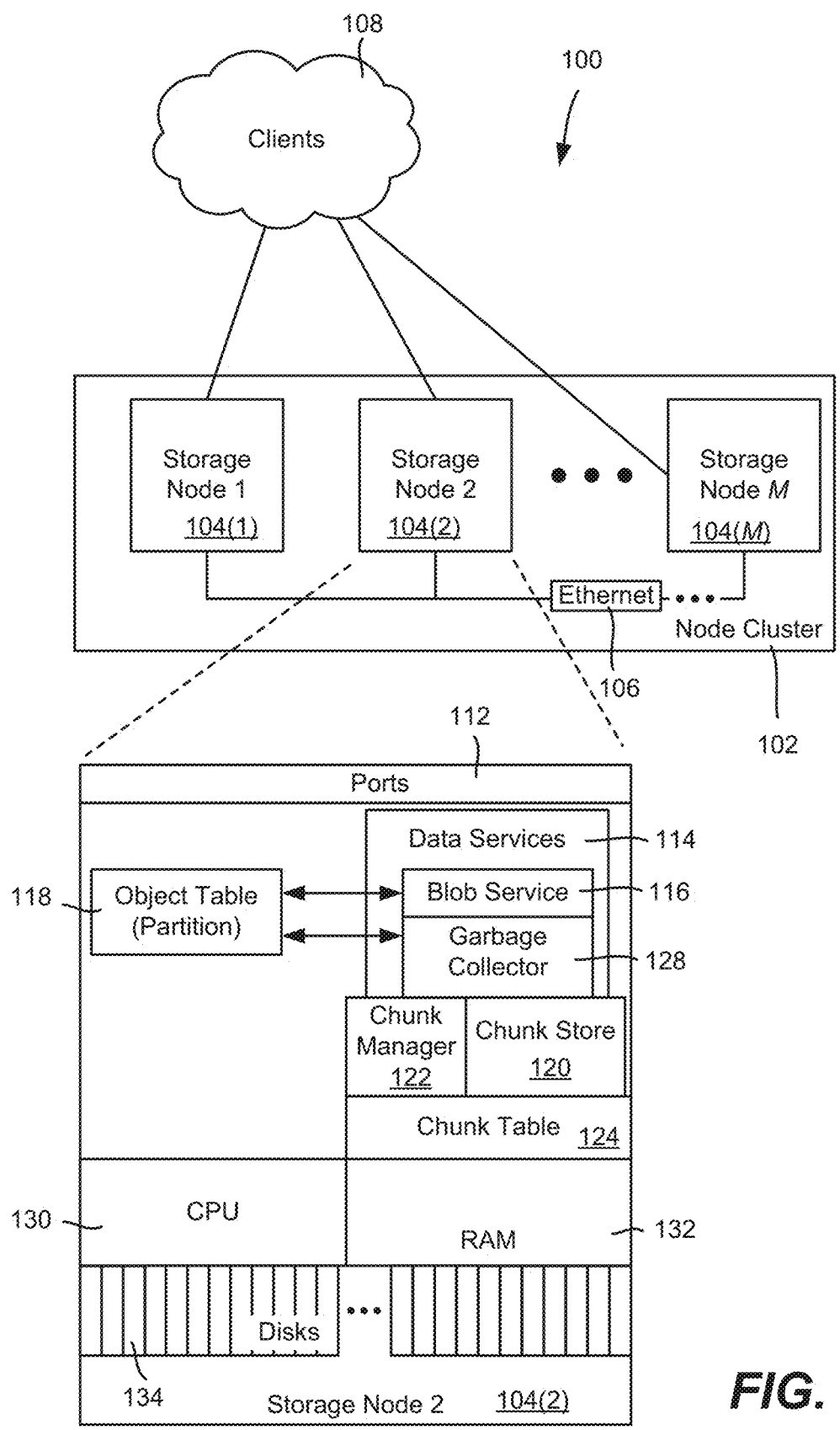
FIG. 1 is an example block diagram representation of part of a data storage system including nodes, in which leaf chunks can be allocated differently from other node chunks, in accordance with various aspects and implementations of the subject disclosure.

Various aspects of the technology described herein are generally directed towards allocating chunks in different ways based on the probability of reclaiming the chunk storage space. In one aspect, chunks for leaves are kept separate from chunks for internal nodes, that is, chunks for storing leaf pages are not used for storing index pages, and chunks for storing index pages are not used for storing leaf pages. In another aspect, chunks for tree leaves are allocated so as to be smaller than chunks for internal nodes for index pages to increase the probability of the leaf pages in a chunk each being updated, thereby resulting in a fully unused leaf chunk that can be garbage collected. This is because based on probability, pages in chunks for internal nodes (N-chunks) are updated much more frequently than pages in chunks for leaves (L-chunks); if the chunk sizes of N-chunks and L-chunks were the same, N-chunks would, based on probability as described herein, tend to become fully unused far more quickly than chunks for pages in L-chunks.

As will be understood, the implementation(s) described herein are non-limiting examples, and variations to the technology can be implemented. For instance, many of the examples herein are based on ECS, however the technology is applicable to any data storage system that has units of data that need to be garbage collected. As another example, although the term "chunk" is used herein to represent any data storage unit or data portion, the term "chunk" is not limited to ECS chunks, but rather represents any data storage unit, such as corresponding to the fragment level or the stripe level in other storages systems. As such, any of the embodiments, aspects, concepts, structures, functionalities, implementations and/or examples described herein are non-limiting, and the technology may be used in various ways that provide benefits and advantages in data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a cloud data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node). For example, ECS™ runs a set of storage services, which together implement storage logic. Services can maintain directory tables for keeping their metadata, which can be implemented as search trees. A blob service 116 maintains an object table 118 (e.g., in various partitions among nodes) that keeps track of objects in the data storage system and generally stores their metadata, including an object's data location information, e.g., within a chunk. There is also a "reverse" directory table (maintained by another service) that keeps a per chunk list of objects that have their data in a particular chunk.

FIG. 1 further represents some additional concepts, in that the user data repository of chunks is maintained in a chunk store 120, managed by another storage service referred to as a chunk manager 122. A chunk table 124 maintains metadata about chunks, e.g., as managed by the chunk manager 122.

In one or more implementations, garbage collection is a duty of the chunk manager 122, represented in FIG. 1 as a garbage collector 128 coupled to (or incorporated into) the chunk manager 122, which in turn is coupled to the chunk store 120, as well as to the blob service 116/object table partition 118 to garbage collect garbage collection candidate chunks that are verified as not containing live data. More particularly, garbage collection is implemented at the chunk level, and operates to only collect empty chunks, that is, those that do not contain live data. In order to facilitate garbage collection, the data storage system uses a version of a reference counting technique, in which the system counts the number of referenced bytes in each chunk. However, reference counting by itself is not sufficiently reliable, and is thus used to obtain the garbage collection candidate chunks. Verification is performed on these garbage collection candidate chunks to determine whether or not a garbage collection candidate chunk does indeed not contain any live data before being garbage collected. It is also feasible for a the garbage collector 128 to (at least at times) operate as a copying garbage collector that copies parts that are in use in a sparsely filled chunk to a new chunk, to thereby make the sparsely filled chunk completely unused and thus able to be garbage collected.

In FIG. 1, a CPU 130 and RAM 132 are shown for completeness; note that the RAM 130 may comprise at least some non-volatile RAM. The node 104(2) further includes storage devices such as disks 134, comprising hard disk drives and/or solid-state drives, or any other suitable type of storage resource. As can be readily appreciated, components of the data storage system including those described herein can be at various times in any storage device or devices, such as in the RAM 132, in the disks 134, or in a combination of both, for example.

Figure 2:
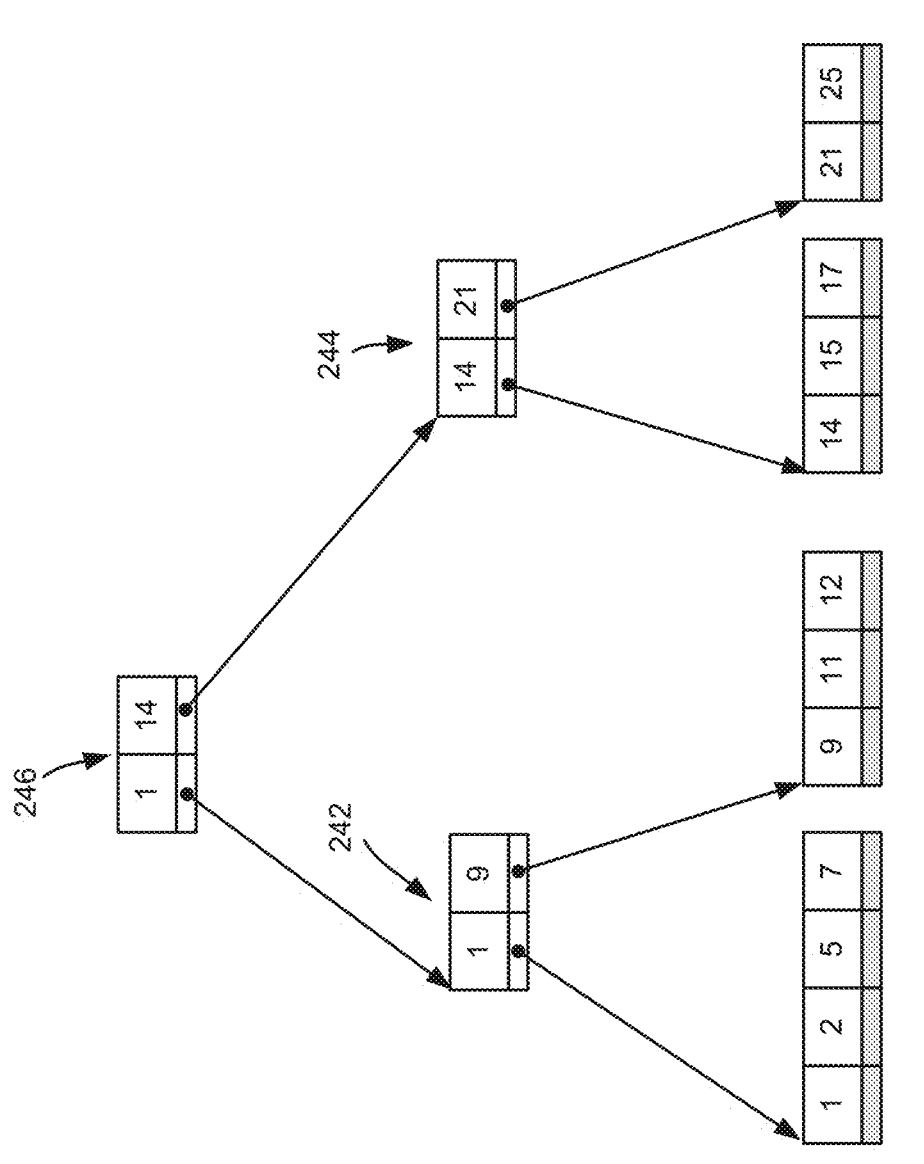
FIGS. 2 and 3 are representations of a tree before (FIG. 2) and after a key-value pair is inserted into the tree (FIG. 3), in accordance with various aspects and implementations of the subject disclosure.

The partitions (of the various trees) including the object table partitions that track the object metadata for user data (e.g., its location in a repository chunk) can be implemented as a search tree (e.g. as a B+ tree), as generally represented in FIG. 2. In FIG. 2, the tree is arranged as <key, value> pairs. The data system described herein for object storage stores object metadata as <key, value> pairs in leaves in B+ trees, in which the key is a unique object identifier, and the value is the object metadata.

As described above, because trees are under a Multi-Version Concurrency Control policy (MVCC), any tree update results in the reallocation of pages, meaning that tree updates are copy-on-write (COW) operations, that is, with a metadata update going to a new leaf page, and with higher (internal and root) pages being changed to new pages containing updated pointers to the new leaf page. The old pages are then unused, whereby the chunks that contain those pages become sparser and sparser, often until the chunk is completely unused.

Figure 3:
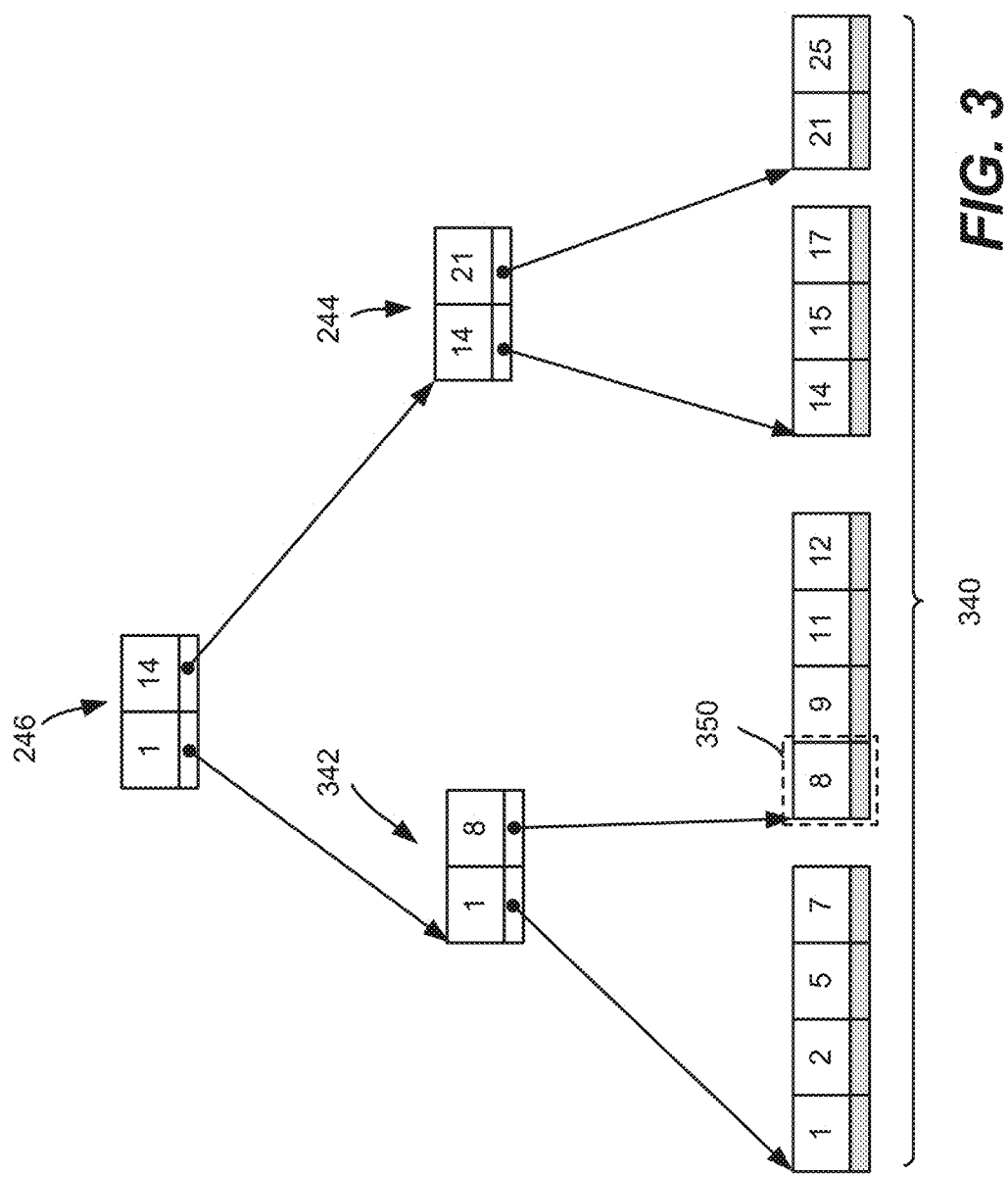

FIGS. 2 and 3 show the concept of updating a search tree as described herein. In general, a root node and an internal node contain pointers by which a leaf node is located. In the example of FIG. 2, the <key, value> pairs labeled 240 are stored in leaf pages (with the numbers indicating the keys, and the grey areas indicating the values). The <key, value> pairs labeled 242, 244 and 246 are stored in index pages, with the keys representing numbers and the values being references/pointers; note that the index pages 246 may be in a root node. In general, based on page and chunk sizes, a B+ tree has a relatively large fan-out ratio at the lower tree level, which provides for higher seek performance.

In FIG. 3, when a new <key, value> pair is inserted (as highlighted via dashed block 350), the tree is changed logically. Note that a relevant <key, value> pair of the index pages is updated (from 242 in FIGS. 1 to 342 in FIG. 2) to point to the new leaf page (within dashed block 350). In MVCC/copy-on-write, index pages are actually replaced, causing what is referred to as "write amplification" herein.

Figure 4:
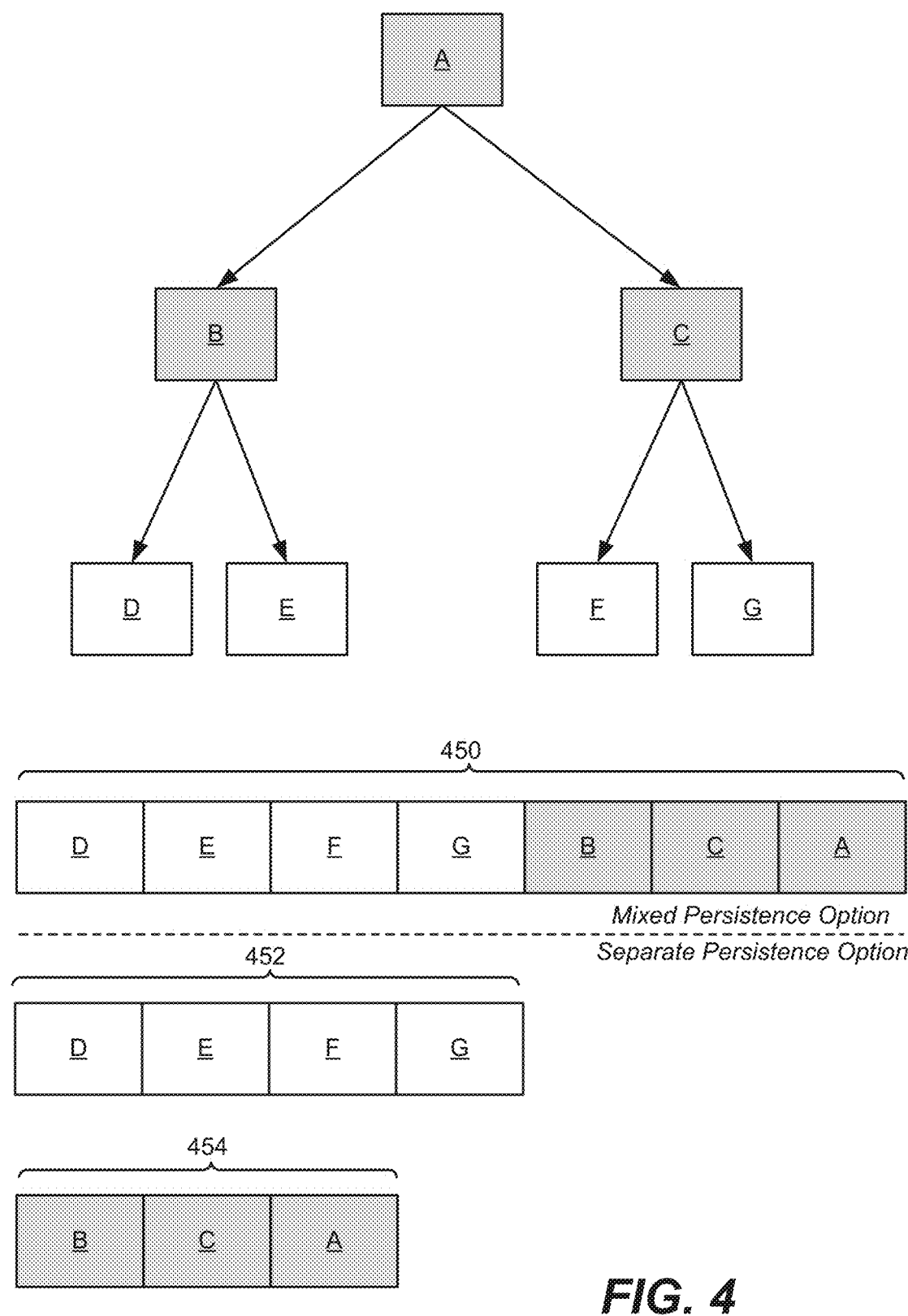
FIGS. 4-6 are representations of a copy-on-write tree of nodes corresponding to pages maintained in chunks, as nodes are updated into new nodes, demonstrating alternative storage options for chunks, in accordance with various aspects and implementations of the subject disclosure.
Figure 5:
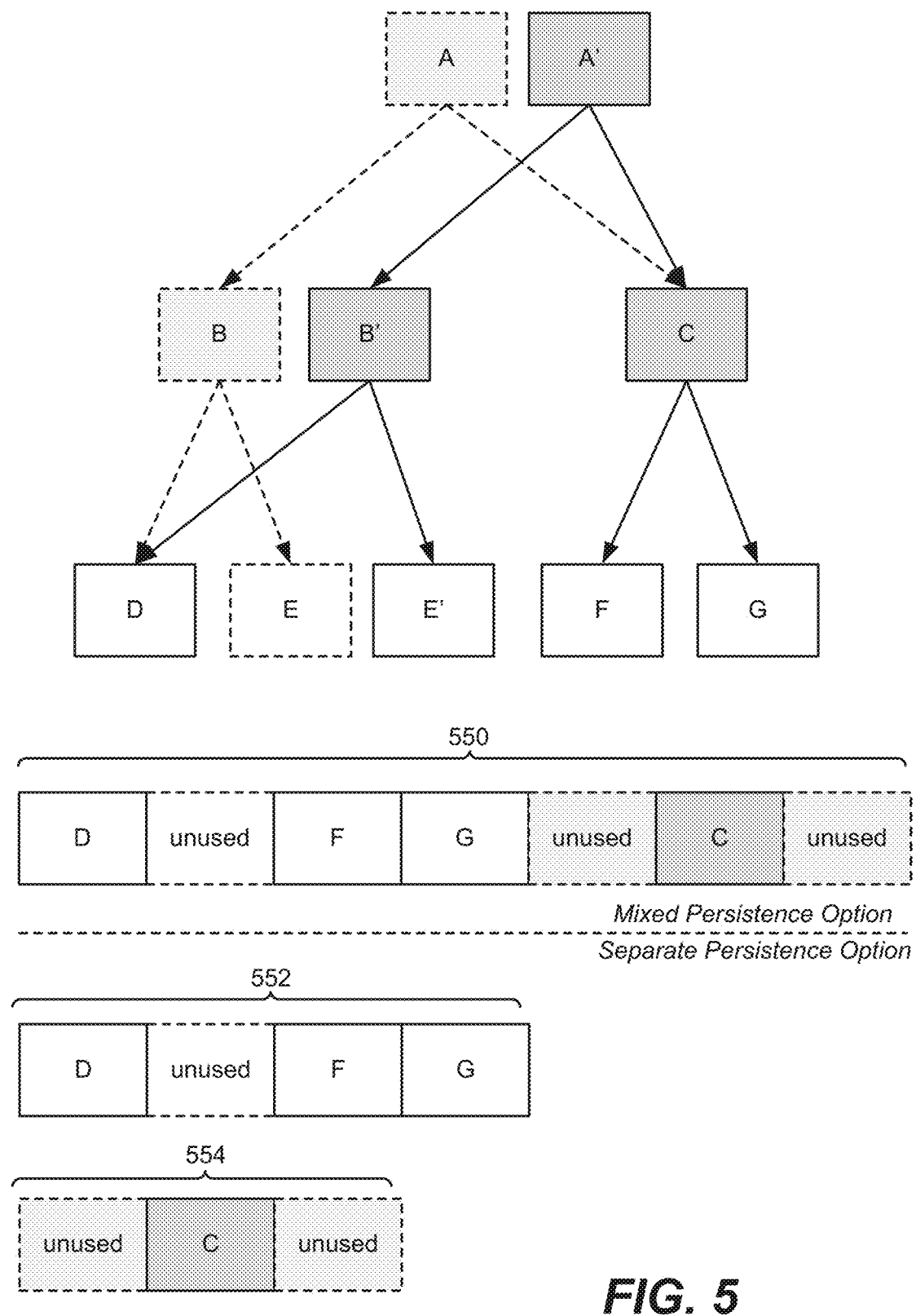
Figure 6:
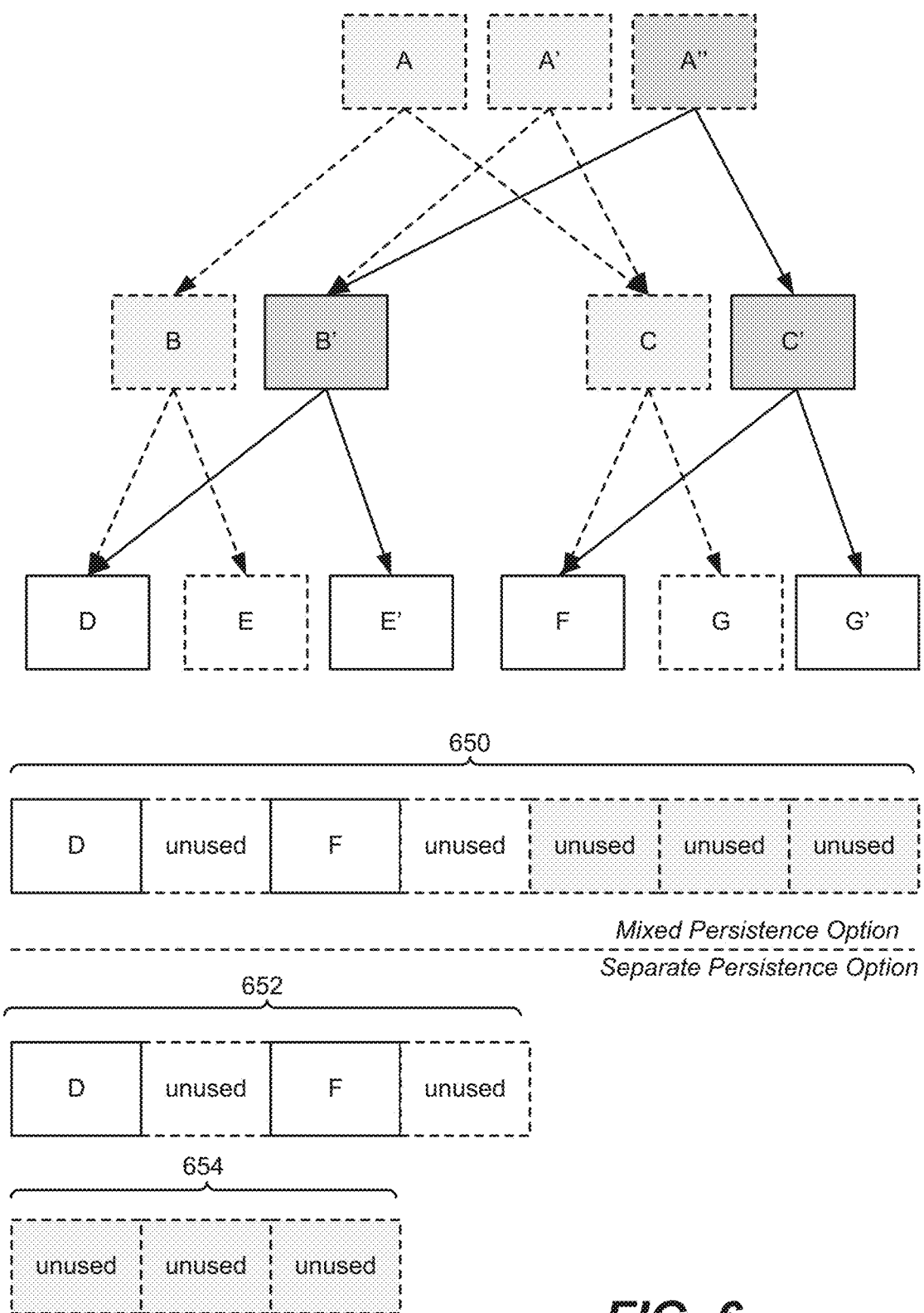

More particularly, a well-known issue of a copy-on-write B+ tree is write amplification, as described herein with reference to FIGS. 4-6. In addition to write amplification, a chunk based architecture such as used in ECS has capacity usage efficiency issues, as also described with reference to FIGS. 4-6. In one aspect, described herein is persisting a copy-on-write B+ tree in a chunk-based system in a way that improves overall capacity usage efficiency.

In the examples of FIGS. 4-6, <key, value> pair details are not shown; instead the depicted tree elements represent a B+ tree pages. In FIG. 4, the shaded pages (labeled A, B and C) represent index pages, and the unshaded pages D, E, F and G represent leaf pages. FIG. 4 also shows two possible alternative options for persistence, namely having the pages A-G in a mixed persistence (leaf and index pages) chunk 450, or having the leaf pages and index pages stored in separate persistence chunks 452 and 454, respectively. In general, only one of these alternative options would be in use in a given data storage system, with the separate persistence option providing benefits and advantages as described herein.

For a copy-on-write B+ tree whenever a <key, value> pair is updated or a new <key, value> pair inserted, the impacted leaf page is rewritten in a copy on write operation. Because a leaf page's address changes, its higher layer parent index page also needs to be updated; note that this recursive parent page updating occurs up to the root. For example, as shown in FIG. 5, when a new <key, value> pair corresponding to leaf page E is inserted, E is copied over and written as a new page (node E'), whereby its parent index pages until the root including B, A need to be written as new nodes as well, shown as index page B' and root page A', stored in some other chunk or chunks; (note that copied-over pages are shown as dashed blocks, and shaded copied-over pages have a lighter shade as well). As can be seen, even when a system only inserts a new <key, value> pair that is less than 1 KB, the actual capacity for the newly written nodes is the size of (E) plus the size of (B) plus the size of (A), e.g., 8 KB for E+64 KB for B+64 KB for A=136 KB, which is write amplification.

As also shown in FIGS. 4 and 5, in a chunk-based data storage system in which disk capacity is managed by chunks, which in conventional system are logical data blocks of a fixed 128M size. As set forth above, both user data and metadata persisted in B+ tree pages are stored in chunks; user data is stored in repository (Repo) chunks while metadata is stored in B+ tree chunks. Note however that in FIGS. 4-6, B+ tree pages are dumped to chunks from the low level to the top level in a batch. By way of example, consider that each chunk can store seven pages, such that the chunk 450 of FIG. 4 contains pages D/E/F/G/B/C/A. Subsequently, when the <key, value> pair in E is updated to E' as in FIG. 5, E'/B'/A' is dumped to a new chunk in one batch, whereby three pages of the chunk become unused, resulting in the chunk being in the state of the chunk labeled 550 with pages D, F, G, and C remaining in use in 550.

Still further, consider that as represented in FIG. 6, in this example at some time later the <key, value> pair corresponding to leaf page G is updated to G', which results in index page C being copied over by a new index page C', and root page A' being copied-over by a new root page A". As a result, two more pages of the chunk (shown in an updated state 650) become unused, namely leaf page G and index page C'; indeed, 5/7 of the chunk in the state 650 is unused capacity.

As set forth above, in general chunk capacity can only be reclaimed (garbage collected) as a whole unit when the entire chunk is not in use. As a result, a copy-on-write B+ tree in a chunk-based system has poor capacity usage efficiency, due to write amplification and non-reclaimable partial garbage inside a chunk. Note that a common user scenario in such a data storage system is archiving; with a large fan-out ratio and a large number of objects, it is typical that most leaf pages are rarely updated, resulting in low capacity usage being quite typical.

As described above, to improve capacity usage efficiency, a copying garbage collector provides a device to reclaim a chunk containing partial garbage. By way of example, the chunk in state 450 of FIG. 2 originally contains D/E/F/G/B/C/A. After two updates corresponding to FIGS. 5 and 6, only pages D/F remain in use, as shown via the chunk in state 650. Copying garbage reclamation can proactively copy D/F to new pages D'/F', whereby the original D/F pages remaining also become garbage such that the entire chunk's capacity can be reclaimed However, copying garbage collection also causes write amplification. For example, in order to reclaim pages D/F, the system needs to update the parent nodes, e.g., D'/F'/B"/C"/A'", which for example can be 8 KB+8 KB+64 KB+64 KB+64 KB=208 KB in new capacity, even though reclaimed chunk D/E/F/G/B/C/A only took 224 KB.

One way to ensure that newly written capacity caused by write amplification is smaller than reclaimed capacity, meaning the reclaiming is indeed reducing the capacity usage, is to set a high partial garbage reclaimable threshold, e.g., ninety-five percent. In other words, only when more than ninety-five percent of a chunk is unused garbage does partial reclamation by copying over the remaining valid pages occur. Note that ninety-five percent is approximately calculated based on a worst-case scenario for a typical 4-level B+ tree, that is copying over one leaf page results in a newly written one leaf page plus three index (including a root) pages.

Described herein is persisting a copy-on-write B+ tree for a chunk-based system that is based on persisting copy-on-write B+ tree's leaf pages and index pages into separate kinds of chunks. In practice, test results (provided below) show that capacity usage efficiency can be highly improved.

The concept of having separate types of chunks is also represented in FIGS. 4-6. When the pages in FIG. 4 are updated into the state shown in FIG. 5, instead of batching chunk updates together, leaf page updates go to a leaf chunk (represented by L-chunk state 452 of FIG. 4 changing to L-chunk state 552 of FIG. 5) while index page updates go to an internal node chunk (represented by N-chunk state 454 of FIG. 4 changing to L-chunk state 554 of FIG. 5). Similarly, when the pages in FIG. 5 are updated into the state shown in FIG. 6, leaf page updates go to the leaf chunk (represented by the L-chunk state 552 of FIG. 5 changing to L-chunk state 652 of FIG. 6) while index page updates go to the internal node chunk (represented by the N-chunk state 554 of FIG. 5 changing to the L-chunk state 654 of FIG. 6).

Even if L-chunks and N-chunks are the same size (they need not be, as described below), it can be seen that N-chunks will likely become fully unused chunks relatively much faster than L-chunks. This is because index pages are more volatile than leaf pages, especially for a B+ tree with a large fan-out. Consider a theoretical mathematics model, with a B+ tree having a fan-out of k and a tree level of h; the page number for each level is k(h−1). For ECS, with 8 KB leaf page size and 64 KB index page size for example, the fan-out is about 200 to 400, meaning that each index page has about 200 to 400 children pages; note that typical tree levels in actual practice tend to be four.

Thus, consider a four level copy-on-write B+ tree with a fan-out of 300, the page numbers for each level are Level-1 (root): 1
Level-2: 300
Level-3: 90,000
Level-4 (leaves): 27,000,000

The total leaf page number is 27,000,000 in this example, which consumes 206 GB for 8K leaf pages. The total index page number, counting the root as an index page, is 90,301, for a total of 5.5 GB for 64K index pages.

Although the index page capacity seems much smaller, consider that in this example every two hours a customer injects 90,000 new objects, with the object identifiers generally distributed randomly. Thus, assuming the random distribution, the 90,000 new objects change every level-3 index page, which further means that means that the index pages are fully rewritten in every two hours, resulting in 5.5 GB*(24/2)*7=462 GB garbage per week. Relatively few of the chunks created within that week can be reclaimed.

By persisting copy-on-write B+ tree leaf pages and index pages into separate kinds of chunks as in the separate persistence option of FIGS. 4-6, the data storage system generates more fully reclaimable chunks, generally because index pages are more volatile and thus more likely to be fully overwritten in a given chunk. Further, for chunks persisting index pages, partial reclamation by a copying garbage collector facilitates a lower garbage threshold, because for index pages write amplification is (64 KB+64 KB+64 KB)/64 KB=3 instead of (8 KB+64 KB+64 KB)/8 KB=25 for leaf pages.

Test results based on injecting the same amount of data and object count provided the following results:

| Persistence | object size | # of objects | user data size | # of B+ tree chunks | Metadata per object |
|---|---|---|---|---|---|
| Mixed | 10 KB | 601.9M | 5740 GB | 33345 | 7.26 |
| Separate | 10 KB | 601.9M | 5740 GB | 17039 | 3.71 (−48.9%) |

As can be seen, the total number of B+ tree chunks on the system is reduced nearly twice compared to original, and metadata per object is reduced 48.9% by persisting copy-on-write B+ tree leaf pages and index pages into separate kinds of chunks.

Turning to another aspect, described is another more efficient technology directed towards managing capacity for B+ trees under Multi-Version Concurrency Control (MVCC). The technology facilitates more efficient garbage collection.

As described herein, leaves store key-value pairs, resulting in a tree update needing the update of one leaf and N−1 nodes, where N is the current depth of the tree. In general, the average lifetime of leaves and nodes at different levels of a B+ tree under MVCC may vary significantly. By way of example, consider a B+ tree with three levels L1, L2, and L3 as generally represented in FIG. 7.

Figure 7:
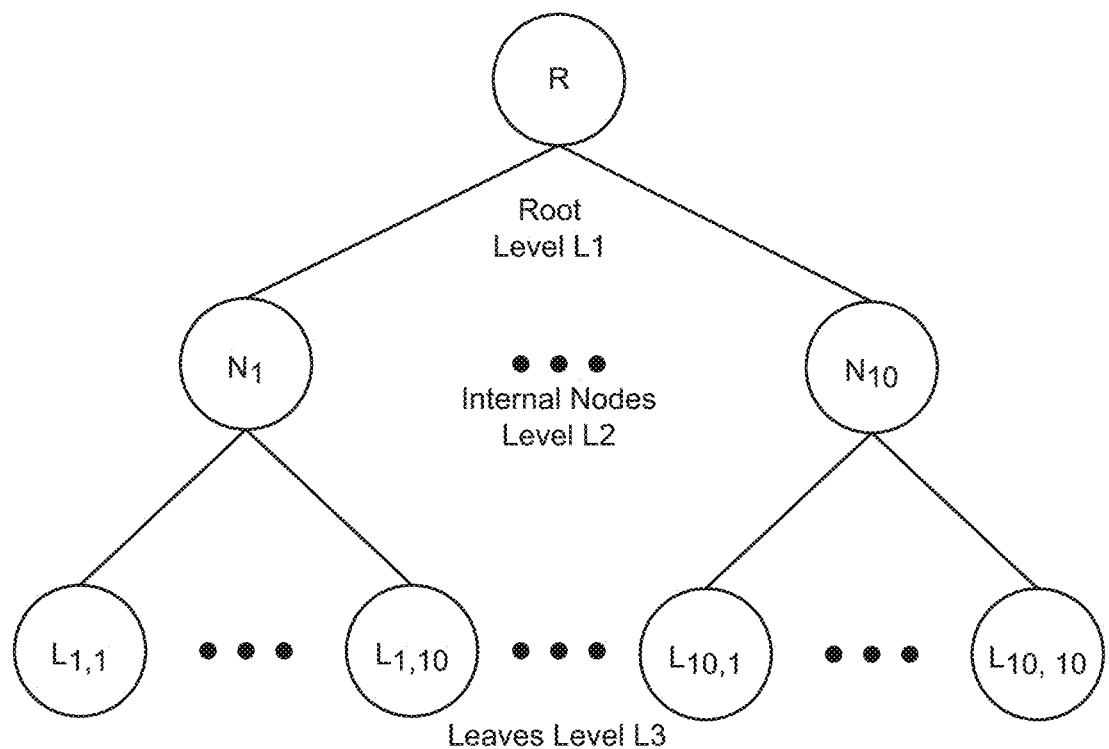
FIG. 7 is a representation of a tree of nodes used for demonstrating the probability of higher nodes being updated more often than leaf nodes, in accordance with various aspects and implementations of the subject disclosure.

In FIG. 7, each node/root has ten subordinates. Consider by way of this example that the probability of a leaf update to a level L3 is:

$$P_{L3}=0.1$$

Using this leaf update probability, the probability of update of a node at the level L2 can be calculated using the formula below:

$$P_{L2}=1-(1-P_{L3})^{10}=1-0.9^{10}\approx 0.65$$

Thus, the probability of a L2 node update is 6.5 times higher than the probability of a leaf update. Similarly, the probability of update of a root can be calculated using the formula below:

$$P_{L1}=1-(1-P_{L2})^{10}=1-0.35^{10}\approx 0.99997$$

That is, the probability of a root update is close to 1. Thus, we can say that the probability of an update decreases as in a tree as nodes go down a tree from the root to a leaf. This means that the expected lifetimes of tree elements increase going down the tree. In particular, the expected lifetime of a tree leaf is relatively long, while the expected lifetime of a tree root is relatively short.

The expected lifetime of a tree chunk depends on the expected lifetimes of the tree elements that the chunk stores, providing a reason to have separate chunks for tree elements at different tree levels. There may be chunks for roots (L1 tree elements), chunks for nodes referenced by roots (L2 tree elements), and so on, until the chunks for leaves (LN). Notwithstanding, depending on actual system parameters (probability of an update, page size, etc.), benefits are obtained with only two chunk types, namely one chunk type for internal nodes/roots and one for leaves.

Most chunks for tree roots and nodes will be updated naturally, that is, without needing a copying garbage collector to copy live data from a chunk to make that chunk entirely unused so that it can be reclaimed. With leaf chunks separately persisted from tree root and internal node chunks, the garbage collection (rotation) speed for tree root and internal node chunks is thus going to be quite high. Conversely, the majority of chunks for leaves may require offloading by a copying garbage collector (which may be a "generational" copying garbage collector that combines older nodes into new chunks generally based on their age). Decreasing the number of partial chunks that need to be garbage collected via copying is desirable.

As described herein, the expected lifetime of a tree chunk also depends on the number of elements it stores. Considering chunks with leaves (L-chunks), because they are the main source of the need for copying garbage collection, again consider that the probability of a leaf update is:

$$P_L=0.9$$

and that for this example one L-chunk contains sixty leaves. As before, such a chunk is fully reclaimable without any partial copying once all the leaves have been updated. The probability of update of all the leaves in an L-chunk containing sixty leaves is:

$$P_C=P_L^{60}\approx 0.0017$$

The probability of getting a fully reclaimable L-chunk is thus rather low. Instead, as described herein, consider that as in FIG. 8 one L-chunk contains only five leaves (twelve times fewer) that the example sixty I. With such a five-leave chunk, the probability of an update to each of the leaves in such an L-chunk is:

$$P_C = P_L^5 \approx 0.59$$

Thus, the probability of getting a fully reclaimable L-chunk with 5 leaves is approximately 350 times higher than the probability of getting a fully reclaimable L-chunk with 60 leaves. Therefore, from a garbage collection perspective, it is beneficial to have not only separate chunks for tree elements from different tree levels, but also to use chunks of different sizes for tree elements from different tree levels. By having tree chunk sizes decrease going down trees from roots to leaves, a larger number of fully reclaimable L-chunks is considerably more probable.

Consider having only two chunk types, one chunk type for Nodes/roots (N-chunks) and one for leaves (L-chunks), which is a very practical technology to implement. N-chunks may be of the standard chunk size, e.g., 128 MB, needing no change. A desirable (smaller size/number of leaves) solution needs to be chosen for L-chunks.

In one implementation, the number can be based on other considerations of the data storage system. More particularly, tree chunks in ECS are protected via triple mirroring, while chunks with user data, known as repository (Repo) chunks, are protected with erasure coding. Each repository chunk, by default, is divided into twelve data fragments of the same size, with four redundant "coding" fragments of the same size produced based on the twelve data fragments. These 12+4 data and coding fragments are stored across an ECS cluster, meaning that ECS works well with capacity blocks of a fragment size, that is, the conventional chunk size/12). Therefore, L-chunks may be based on the size of a fragment, e.g. 128 MB/12, which corresponds to twelve times fewer leaves per L-chunk. This facilitates more fully reclaimable L-chunks without complicating the capacity allocation algorithm in ECS.\

Figure 8:
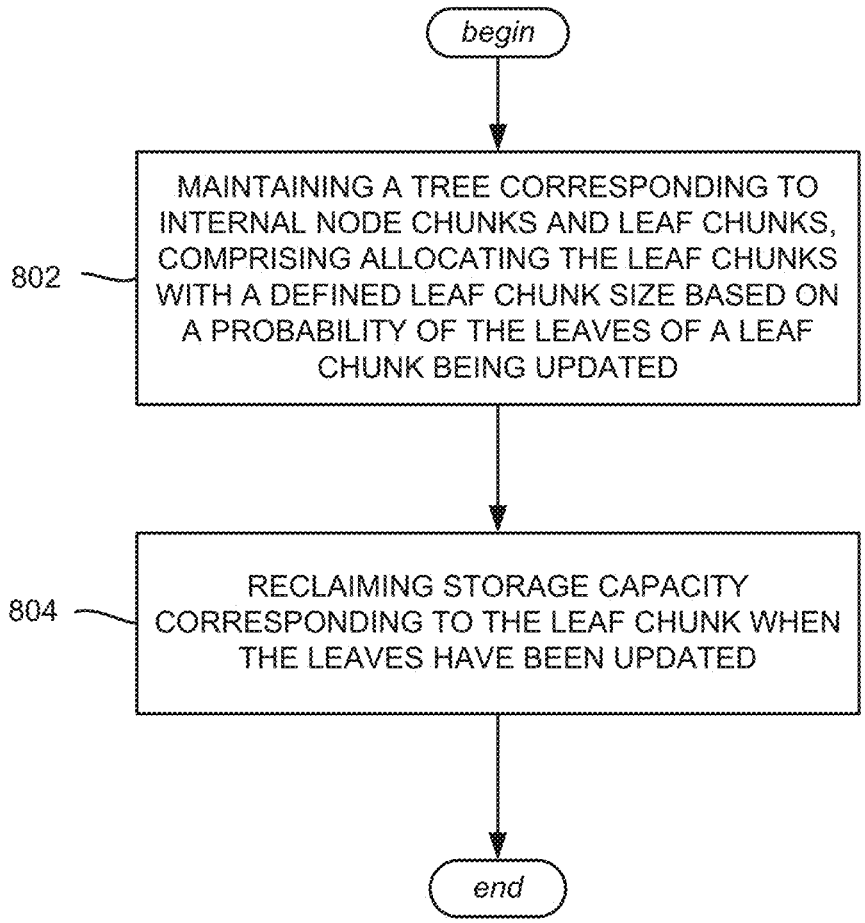
FIG. 8 is a flow diagram representation of example operations related to maintaining a tree corresponding to internal node chunks and leaf chunks, facilitating the reclaiming of chunk capacity, in accordance with various aspects and implementations of the subject disclosure.

One or more aspects are represented in FIG. 8, and for example can be a system, comprising a processor, and a memory that stores executable instructions that, when executed by the processor, facilitate performance of operations. Example operations can comprise operation 802, which represents maintaining a tree of internal node chunks and leaf chunks, comprising allocating the leaf chunks with a defined leaf chunk size based on a probability of the leaves of a leaf chunk being updated. Operation 804 represents reclaiming storage capacity corresponding to the leaf chunk when the leaves have been updated.

Allocating the leaf chunk with the defined leaf chunk size based on the probability of the leaves of the leaf chunk being updated can comprise allocating the leaf chunk based on a number of leaves in the leaf chunk. Allocating the leaf chunk with the defined leaf chunk size based on the probability of the leaves of the leaf chunk being updated can comprise allocating the leaf chunk to correspond to a size of a chunk fragment.

Further operations can comprise updating a leaf in the leaf chunk. Further operations can comprise in response to the updating the leaf in the leaf chunk, updating an internal node chunk of the tree, wherein the internal node chunk is a parent node to the leaf chunk.

Allocating the leaf chunk with the defined leaf chunk size based on the probability of the leaves of the leaf chunk being updated can comprise allocating the leaf chunks with the defined size that is smaller than a size of the internal node chunks.

Further operations can comprise allocating the internal node chunks with a defined internal node chunk size based on a probability of an internal node chunk being updated.

The defined internal node chunk size can be equal to or about twelve times the defined leaf chunk size.

Further operations can comprise allocating a root node with a size equal to or substantially equal to the defined internal node chunk size. Further operations can comprise allocating nodes with a size based on a level of each node in a B+ tree.

The tree can be a B+ tree.

Figure 9:
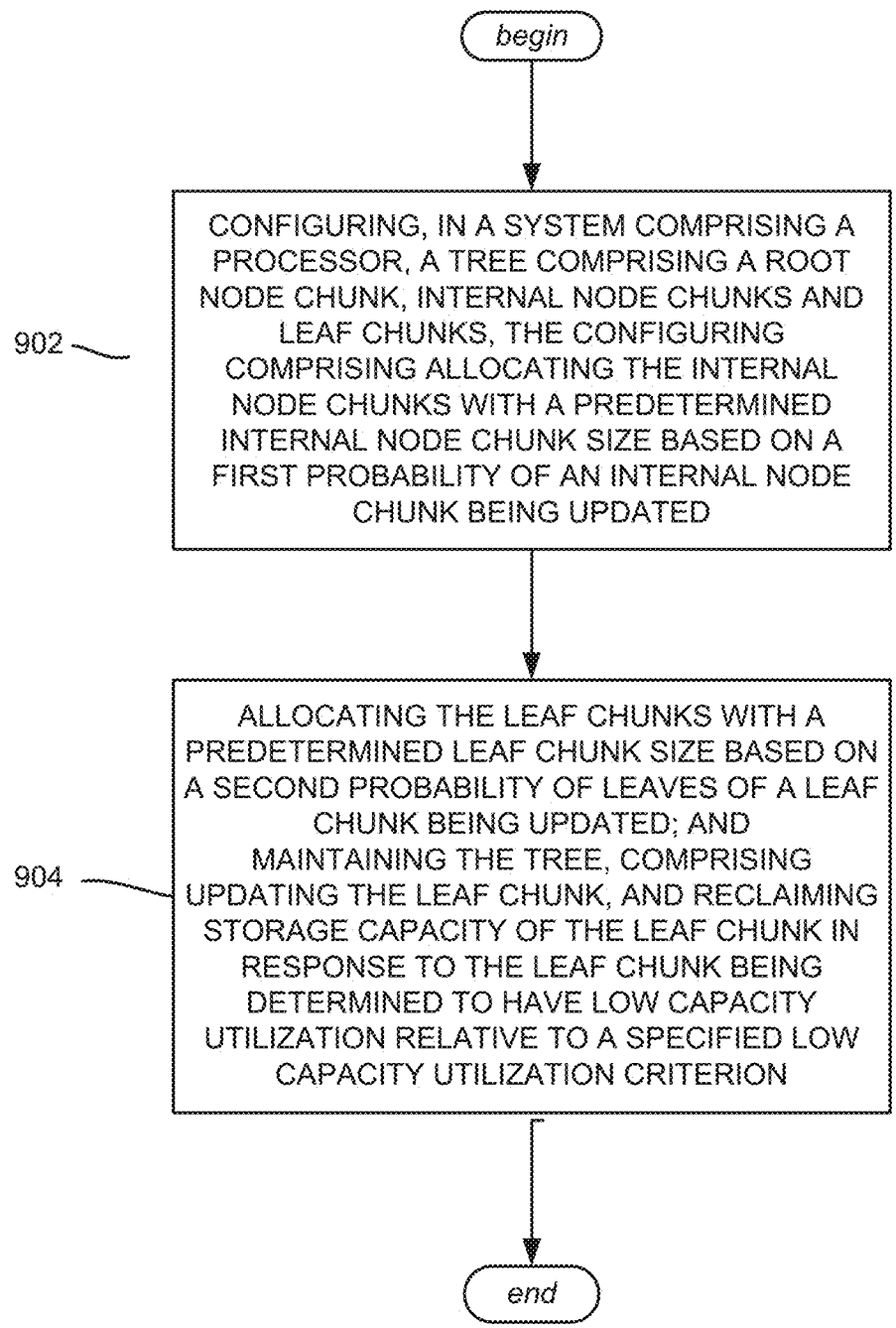
FIG. 9 is a flow diagram representation of example operations related to configuring a tree corresponding to internal node chunks and leaf chunks, with separately allocated leaf nodes and internal nodes that facilitate the reclaiming of chunk capacity, in accordance with various aspects and implementations of the subject disclosure.

One or more example aspects are represented in FIG. 9, and can correspond to operations of a method, for example. Example operations comprise operation 902, which represents configuring, in a system comprising a processor, a tree comprising a root node chunk, internal node chunks and leaf chunks, the configuring comprising allocating the internal node chunks with a predetermined internal node chunk size based on a first probability of an internal node chunk being updated, and allocating the leaf chunks with a predetermined leaf chunk size based on a second probability of leaves of a leaf chunk being updated. Operation 904 represents maintaining the tree, comprising updating the leaf chunk, and reclaiming storage capacity of the leaf chunk in response to the leaf chunk being determined to have low capacity utilization relative to a specified low capacity utilization criterion.

Reclaiming the leaf chunk in response to the leaf chunk being determined to have low capacity utilization relative to the specified low capacity criterion can comprise reclaiming the leaf chunk when each of the leaves in the leaf chunk have been updated.

Allocating the leaf chunks with the predetermined leaf chunk size can comprise allocating the leaf chunks based on a number of erasure coding data fragments.

Allocating the internal node chunks with a predetermined internal node chunk size based on the first probability of the internal node chunk being updated, and the allocating the leaf chunks with a predetermined leaf chunk size based on the second probability of the leaves of the leaf chunk being updated, can comprise allocating the internal node chunk with an predetermined internal node size that is equal to or about twelve times the predetermined leaf chunk size.

Aspects of the configuring can comprise allocating a root node with a size equal to or substantially equal to the predetermined internal node chunk size.

Figure 10:
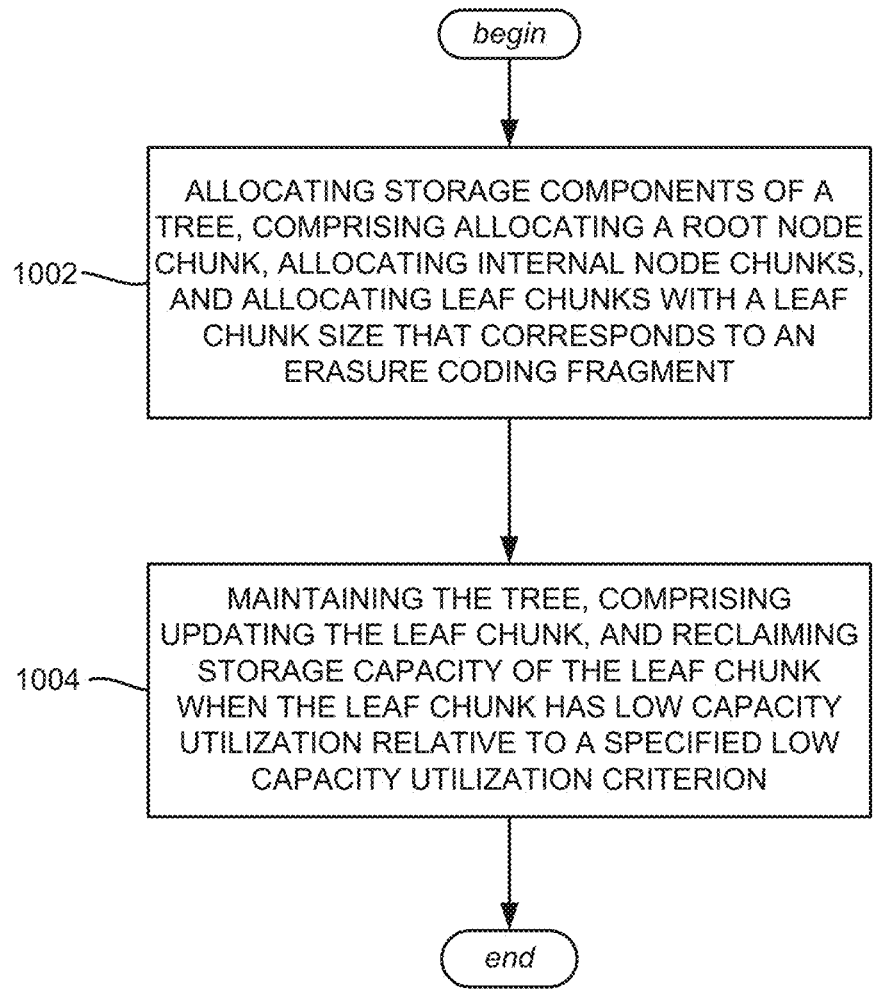
FIG. 10 is a flow diagram representation of example operations related to allocating components of a tree corresponding to internal node chunks and leaf chunks, and maintaining the tree by reclaiming storage capacity, in accordance with various aspects and implementations of the subject disclosure

One or more aspects, such as implemented in a machine-readable storage medium, comprising executable instructions that, when executed by a processor, facilitate performance of operations, can be directed towards operations exemplified in FIG. 10. Operation 1002 represents allocating storage components of a tree, comprising allocating a root node chunk, allocating internal node chunks, and allocating leaf chunks with a leaf chunk size that corresponds to erasure coding fragments. Operation 1004 represents maintaining the tree, comprising updating the leaf chunk, and reclaiming storage capacity of the leaf chunk when the leaf chunk has low capacity utilization relative to a specified low capacity utilization criterion.

Reclaiming the leaf chunk when the leaf chunk has low capacity utilization relative to the specified low capacity criterion can comprise reclaiming the leaf chunk when each of the leaves in the leaf chunk have been updated. Allocating the internal node chunks can comprise allocating the internal node chunks to each have a same or substantially the same internal node chunk size, and wherein the allocating the leaf chunks with the leaf chunk size can comprise allocating each of the leaf chunks to be equal to or about one twelfth of the internal node chunk size.

Reclaiming the storage capacity of the leaf chunk when the leaf chunk has low capacity utilization relative to a specified low capacity utilization criterion can comprise reclaiming storage capacity of the leaf chunk when the leaf chunk contains no leaves that are in use.

As can be seen, described herein is a technology that facilitates more efficient garbage collection. By having leaf chunks separate from node chunks, the probability of having a fully reclaimable (without copying) chunk is increased. Similarly, by having smaller sized leaf chunks relative to node chunks, the probability of having a fully reclaimable (without copying) leaf chunks is increased.

Figure 11:
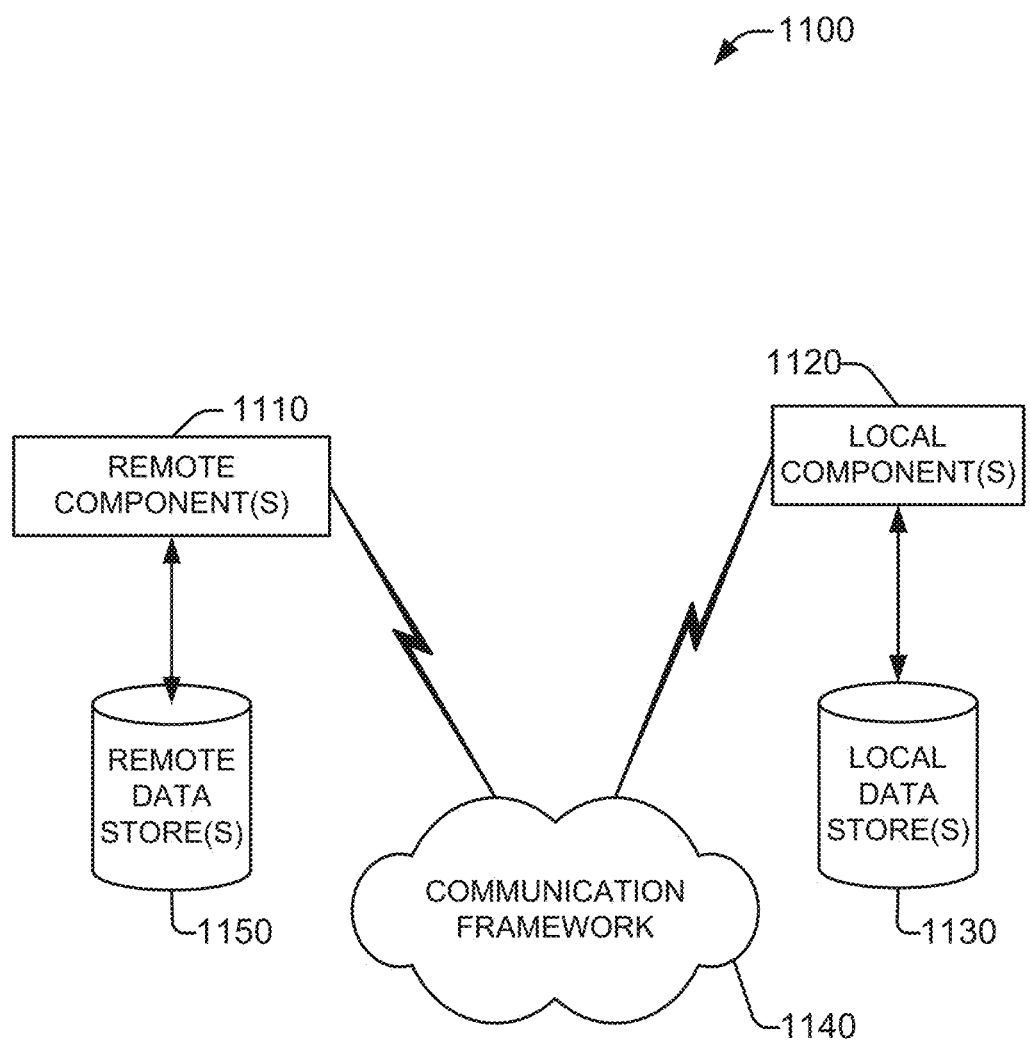
FIG. 11 depicts an example schematic block diagram of a computing environment with which the disclosed subject matter can interact, in accordance with various aspects and implementations of the subject disclosure.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110 and 1120, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
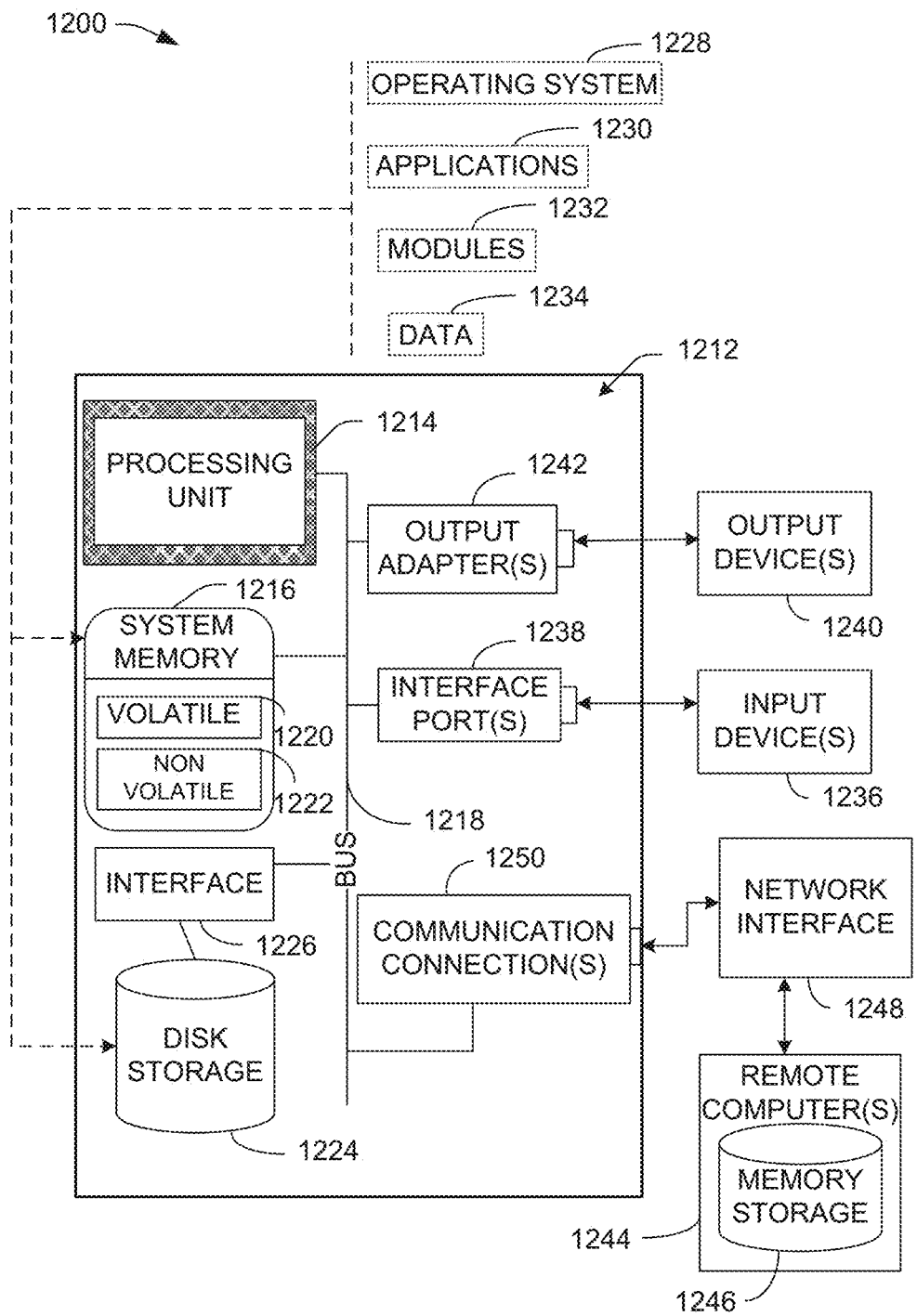
FIG. 12 illustrates an example block diagram of a computing system operable to execute the disclosed systems and methods in accordance with various aspects and implementations of the subject disclosure.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1220 (see below), nonvolatile memory 1222 (see below), disk storage 1224 (see below), and memory storage 1246 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with one or more embodiments/implementations described herein. Computer 1212, can comprise a processing unit 1214, a system memory 1216, and a system bus 1218. System bus 1218 couples system components comprising, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1216 can comprise volatile memory 1220 and nonvolatile memory 1222. A basic input/output system, containing routines to transfer information between elements within computer 1212, such as during start-up, can be stored in nonvolatile memory 1222. By way of illustration, and not limitation, nonvolatile memory 1222 can comprise read only memory, programmable read only memory, electrically programmable read only memory, electrically erasable read only memory, or flash memory. Volatile memory 1220 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synch-Link dynamic read only memory, Rambus direct read only memory, direct Rambus dynamic read only memory, and Rambus dynamic read only memory.

Computer 1212 can also comprise removable/non-removable, volatile/non-volatile computer storage media. FIG. 12 illustrates, for example, disk storage 1224. Disk storage 1224 comprises, but is not limited to, devices like a magnetic disk drive, floppy disk drive, tape drive, flash memory card, or memory stick. In addition, disk storage 1224 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1224 to system bus 1218, a removable or non-removable interface is typically used, such as interface 1226.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software comprises an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1212. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 comprise, for example, a serial port, a parallel port, a game port, a universal serial bus, an infrared port, a Bluetooth port, an IP port, or a logical port associated with a wireless service, etc. Output device(s) 1240 use some of the same type of ports as input device(s) 1236.

Thus, for example, a universal serial busport can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 comprise, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1212. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
maintaining a tree corresponding to internal node chunks and leaf chunks, comprising allocating the leaf chunks with a defined leaf chunk size based on a probability of leaves of a leaf chunk being updated;
allocating the internal node chunks with a defined internal node chunk size based on a probability of an internal node chunk being updated, wherein the defined internal node chunk size is equal to twelve times the defined leaf chunk size; and
reclaiming storage capacity corresponding to the leaf chunk when the leaves have been updated.

2. The system of claim 1, wherein the allocating the leaf chunk with the defined leaf chunk size based on the probability of the leaves of the leaf chunk being updated comprises allocating the leaf chunk based on a number of leaves in the leaf chunk.

3. The system of claim 1, wherein the allocating the leaf chunk with the defined leaf chunk size based on the probability of the leaves of the leaf chunk being updated comprises allocating the leaf chunk to correspond to a size of a chunk fragment.

4. The system of claim 1, wherein the operations further comprise, updating a leaf in the leaf chunk.

5. The system of claim 4, wherein the operations further comprise, in response to the updating the leaf in the leaf chunk, updating the internal node chunk of the tree, wherein the internal node chunk is a parent node to the leaf chunk.

6. The system of claim 1, wherein the allocating the leaf chunk with the defined leaf chunk size based on the probability of the leaves of the leaf chunk being updated comprises allocating the leaf chunks with the defined leaf chunk size that is smaller than a size of the internal node chunks.

7. The system of claim 1, wherein the operations further comprise allocating a root node with a size equal to the defined internal node chunk size.

8. The system of claim 1, wherein the operations further comprise allocating nodes with a size based on a level of each node in a B+ tree.

9. The system of claim 1, wherein the tree is a B+ tree.

10. A method, comprising,
configuring, in a system comprising a processor, a tree comprising a root node chunk, internal node chunks and leaf chunks, the configuring comprising allocating the internal node chunks with a predetermined internal node chunk size based on a first probability of an internal node chunk being updated, and allocating the leaf chunks with a predetermined leaf chunk size based on a second probability of leaves of a leaf chunk being updated, wherein the predetermined internal node chunk size that is equal to twelve times the predetermined leaf chunk size; and
maintaining the tree, comprising updating the leaf chunk, and reclaiming storage capacity of the leaf chunk in response to the leaf chunk being determined to have low capacity utilization relative to a specified low capacity utilization criterion.

11. The method of claim 10, wherein the reclaiming the leaf chunk in response to the leaf chunk being determined to have the low capacity utilization relative to the specified low capacity utilization criterion comprises reclaiming the leaf chunk when leaves in the leaf chunk have been updated.

12. The method of claim 10, wherein the allocating the leaf chunks with the predetermined leaf chunk size comprises allocating the leaf chunks based on a number of erasure coding data fragments.

13. The method of claim 10, wherein the configuring further comprises allocating a root node with a size equal to the predetermined internal node chunk size.

14. A non-transitory machine-readable medium, comprising executable instructions that, when executed by a processor, facilitate performance of operations, the operations comprising:
allocating storage components of a tree, comprising allocating a root node chunk, allocating internal node chunks to each have a same or substantially the same internal node chunk size, and allocating leaf chunks with a leaf chunk size that corresponds to erasure coding fragments, and the leaf chunk size is equal to one twelfth of the internal node chunk size; and
maintaining the tree, comprising updating a leaf chunk, and reclaiming storage capacity of the leaf chunk when the leaf chunk has low capacity utilization relative to a specified low capacity utilization criterion.

15. The non-transitory machine-readable medium of claim 14, wherein the reclaiming the leaf chunk when the leaf chunk has the low capacity utilization relative to the specified low capacity utilization criterion comprises reclaiming the leaf chunk when leaves in the leaf chunk have been updated.

16. The non-transitory machine-readable medium of claim 15, wherein the reclaiming the storage capacity of the leaf chunk when the leaf chunk has the low capacity utilization relative to the specified low capacity utilization criterion comprises reclaiming the storage capacity of the leaf chunk when the leaf chunk contains no leaves that are in use.

17. The non-transitory machine-readable medium of claim 14, wherein the root node chunk has a size equal to the internal node chunk size.

18. The non-transitory machine-readable medium of claim 14, wherein the tree is a B+ tree.

19. The non-transitory machine-readable medium of claim 14, wherein the operations further comprise, updating a leaf in the leaf chunk.

20. The non-transitory machine-readable medium of claim 19, wherein the operations further comprise, in response to the updating the leaf in the leaf chunk, updating an internal node chunk of the tree, wherein the internal node chunk is a parent node to the leaf chunk.

* * * * *